May 6, 1941.　　　A. A. AICHER　　　2,240,481
CHEMICAL REACTION CHAMBER
Filed Nov. 17, 1938
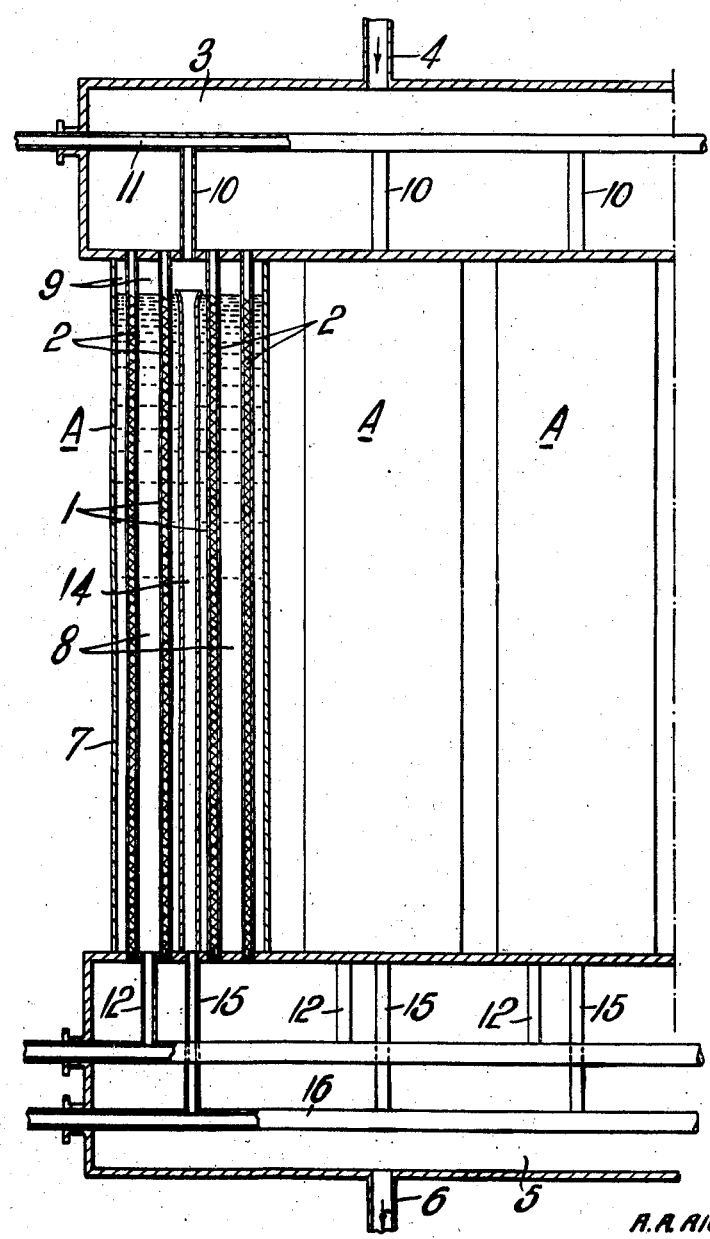
A. A. AICHER.
INVENTOR
ATTORNEY Patented May 6, 1941

2,240,481

UNITED STATES PATENT OFFICE 2,240,481

CHEMICAL REACTION CHAMBER

Alfred August Aicher, Wimbledon, England

Application November 17, 1938, Serial No. 240,992
In Great Britain November 19, 1937

1 Claim. (Cl. 23—288)

This invention relates to chemical reaction chambers and has reference to the control by cooling of the temperature of chambers in which exothermic chemical reactions take place. The apparatus of the invention is of the kind in which evaporative cooling is employed, the reaction chamber being in heat exchanging relationship with a liquid which (under the prevailing pressure conditions) boils at the temperature at which the reaction chamber is to be maintained, so that the excess heat generated by the reaction is absorbed by the latent heat of vaporisation of the liquid. An apparatus of this kind is described in U. S. Patent 1,604,739.

The present invention comprises apparatus for carrying out exothermic reactions in which the reaction chamber is formed by a plurality of tubes, which are connected together at their ends by headers forming an inlet and an outlet for the reaction materials, and these tubes are surrounded by a common casing, the lower part of which contains a liquid which (under the prevailing pressure conditions) boils at the temperature at which the reaction chamber is to be maintained and is provided with an inlet for such liquid, while the upper part of the casing contains the vapour produced by the boiling liquid and is provided with an outlet for such vapour, and wherein one or more additional tubes are provided which communicate at their upper ends with the vapour space of the casing and extend into the liquid space of the casing but do not communicate therewith. A commercial plant will ordinarily comprise a large number of such units and the vapour spaces of the casings of all these units are then preferably placed in communication with one another. Similarly the liquid inlets and the inlets and outlets for the reaction products of all the units may be connected together.

One embodiment of the invention is illustrated in the accompanying drawing which shows three of the units of an apparatus comprising a large number of identical units, one of the units illustrated being shown in section.

In the apparatus illustrated, each of the units (designated in general by the letter A) comprises a plurality of parallel vertical tubes 1, which are filled to within a short distance of their upper ends with catalytic material 2 and together constitute the reaction chamber. The upper ends of these tubes communicate with a header 3, common to all the units A, into which the reaction materials are continuously introduced through an inlet pipe 4. In a similar manner the lower ends of the tubes 1 communicate with a header 5, common to all the units A, from which the products of reaction are continuously withdrawn through an outlet pipe 6.

The tubes 1 of each unit are surrounded by a common casing 7, the lower part of which is filled with a liquid 8, whose boiling point at the pressure prevailing within the casing 7 is equal to the temperature at which it is desired that the reaction should proceed. The surface level of the liquid 8 is somewhat above the level of the top of the catalytic material 2 in the reaction tubes 1. The upper part of the casing 7 above the level of the liquid 8 constitutes a vapour space 9 which communicates through a tube 10 with a pipe 11, common to all the units, through which the vapour of the liquid 8 produced by the heat of the reaction is continuously withdrawn from the casing. Fresh liquid is continuously admitted to the casing 7 through a tube 12 communicating on the one hand with the lower part of the casing and on the other hand with a liquid supply pipe 13, common to all the units. The vapour withdrawn through the pipe 11 may be condensed and the recovered liquid returned to the casings through the pipe 13, thus forming a closed system for the cooling liquid.

When the reaction is proceeding normally, the heat generated in the reaction tubes 1 is transmitted through the walls of these tubes to the liquid 8 and causes vaporisation of that liquid, the temperature of the whole system being thus maintained at the boiling point of the liquid 8. It may, however, easily occur in practice that the temperature of some part of the apparatus falls below the desired point and such variations in temperature are detrimental to the progress of the reaction.

In order to minimise any such fall in temperature and ensure its rapid correction, each unit A is provided with at least one tube 14 which communicates at its upper end with the vapour space 9 of the casing, passes through the liquid space of the casing without communicating therewith and is connected at its lower end to a tube 15, through which it communicates with a drainage pipe 16, common to all the units. When the reaction is proceeding normally throughout the apparatus, the tubes and pipes 14, 15 and 16 contain only the vapour of the liquid 8, as do the vapour spaces 9 and the tubes and pipes 10 and 11. If the temperature of any unit should fall below the desired temperature (that is the boiling point of the liquid 8), vapour will condense on the inner surface of the wall of the tube 14 in the unit affected. The latent heat of vaporisation of the vapour is thus given up to the tube 14 and transmitted to the liquid 8 in the unit affected. This process continues, fresh vapour flowing into the tube 14 of the affected unit through lines 11 and 10 from the remaining units of the apparatus, until the temperature of the unit in question has been restored to normal. The vapour condensed in the tubes 14 is withdrawn through the tubes 15 and the pipe 16 and either runs to waste or is returned together with the condensate from the pipe 11 to the liquid inlet pipe 13.

What I claim and desire to secure by Letters Patent is:

A catalytic apparatus comprising a plurality of reaction units, each unit including a catalyzer chamber containing a catalyst and having inlet and outlet openings for the passage of reaction gases therethrough, a casing enclosing said chamber and spaced therefrom to provide a liquid compartment containing a liquid in heat-exchange relationship with said catalyst, an outlet tube opening into a vapor space in said compartment above said liquid for the removal of vaporized liquid therefrom and an inlet tube connected to said compartment for returning liquid thereto, a tubular element extending into the body of said liquid in heat-exchange relationship therewith, having its upper end opening into said vapor space and its lower end opening into a conduit for withdrawal of liquid condensed in said tube, and a conduit inter-connecting said vapor space of each unit whereby vapor may flow from one to the other space upon temperature fluctuations in the several units.

ALFRED AUGUST AICHER.